United States Patent
Cai et al.

(10) Patent No.: US 7,620,384 B2
(45) Date of Patent: Nov. 17, 2009

(54) CONVERGED SERVICE CONTROL FOR IMS NETWORKS AND LEGACY NETWORKS

(75) Inventors: Yigang Cai, Naperville, IL (US); Sheng Chen, Beijing (CN); Xiangyang Li, Beijing (CN); Peng Wang, Beijing (CN); Rui Yun Wu, Beijing (CN); Jay Z. Zhao, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 396 days.

(21) Appl. No.: 11/374,262

(22) Filed: Mar. 13, 2006

(65) Prior Publication Data
US 2007/0173226 A1    Jul. 26, 2007

(51) Int. Cl.
    *H04M 11/00*    (2006.01)
(52) U.S. Cl. ............................ 455/406; 455/461
(58) Field of Classification Search ............. 455/405, 455/461; 379/114.28, 221.08, 88.13, 88.22
    See application file for complete search history.

(56) References Cited

U.S. PATENT DOCUMENTS

2006/0200532 A1* 9/2006 Skladman et al. ........... 709/206
2007/0074280 A1* 3/2007 Callaghan .................... 726/12

* cited by examiner

*Primary Examiner*—Sam Bhattacharya
(74) *Attorney, Agent, or Firm*—Duft, Bornsen & Fishman, LLP (57) ABSTRACT

Systems and methods are disclosed to provide converged service control and converged charging in legacy networks and IMS networks. A converged service control system of the invention includes a protocol interface and a service controller. The protocol interface receives call messages from the legacy networks and the IMS networks, and converts the call messages to a common protocol. The service controller then processes the call messages in the common protocol to provide service control to the legacy networks and the IMS networks. The service controller is also enabled to provide online and offline charging for the legacy networks and the IMS networks.

20 Claims, 9 Drawing Sheets

CONVERGED SERVICE CONTROL FOR IMS NETWORKS AND LEGACY NETWORKS

RELATED APPLICATIONS

This patent application claims priority to a foreign patent application filed in the Chinese Patent Office, having the application number 200610006045.5 and filed on Jan. 24, 2006.

BACKGROUND OF THE INVENTION

1. Field of the Invention

The invention is related to the field of communications, and in particular, to converged service control for IMS networks and legacy networks.

2. Statement of the Problem

Intelligent networks (IN) and advanced intelligent networks (AIN) are service-independent telecommunications networks. An example of a wireline intelligent network is a Public Switched Telephone Network (PSTN), and examples of wireless intelligent networks are CDMA networks and GSM networks. Intelligent networks move the intelligence out of the switches to intelligent peripherals or network resources distributed throughout the network. This provides the network operator with the means to develop and control services more efficiently. Examples of services provided by intelligent networks include 800-number routing, abbreviated dialing, pre-paid services, Virtual Private Networks, notification and voice recognition services, etc. Wireless and wireline intelligent networks are referred to generally herein as legacy networks.

Other networks are being developed to provide advanced multimedia applications, such as IP Multimedia Subsystem (IMS) networks. As set forth in the 3$^{rd}$ Generation Partnership Project (3GPP), the IMS provides a common core network having access-agnostic network architecture for converged networks. Service providers are accepting this architecture in next generation network evolution. The IMS architecture is initially defined by the 3GPP to provide multimedia services to mobile subscribers over an Internet Protocol (IP) network. IP networks have become the most cost savings bearer network to transmit video, voice, and data. IMS uses the advantage of IP networks to provide multimedia services for IMS subscribers on an IMS platform. The signaling used within IMS networks is Session Initiation Protocol (SIP). IMS defines the standard SIP interface between application servers, the IMS core network (CSCF), the IMS subscriber, the IMS database (HSS), and IMS billing/charging elements. These standards can reduce the network integration costs and let the subscriber enjoy more stable services.

On the IMS platform, the traditional supplementary services, such as call forwarding, conferencing, and call waiting are available for IMS subscribers. Also, many new data services, such as instant messaging, video calls, video on wait, and web-based services, will also be available for the IMS subscribers.

Figure 1:
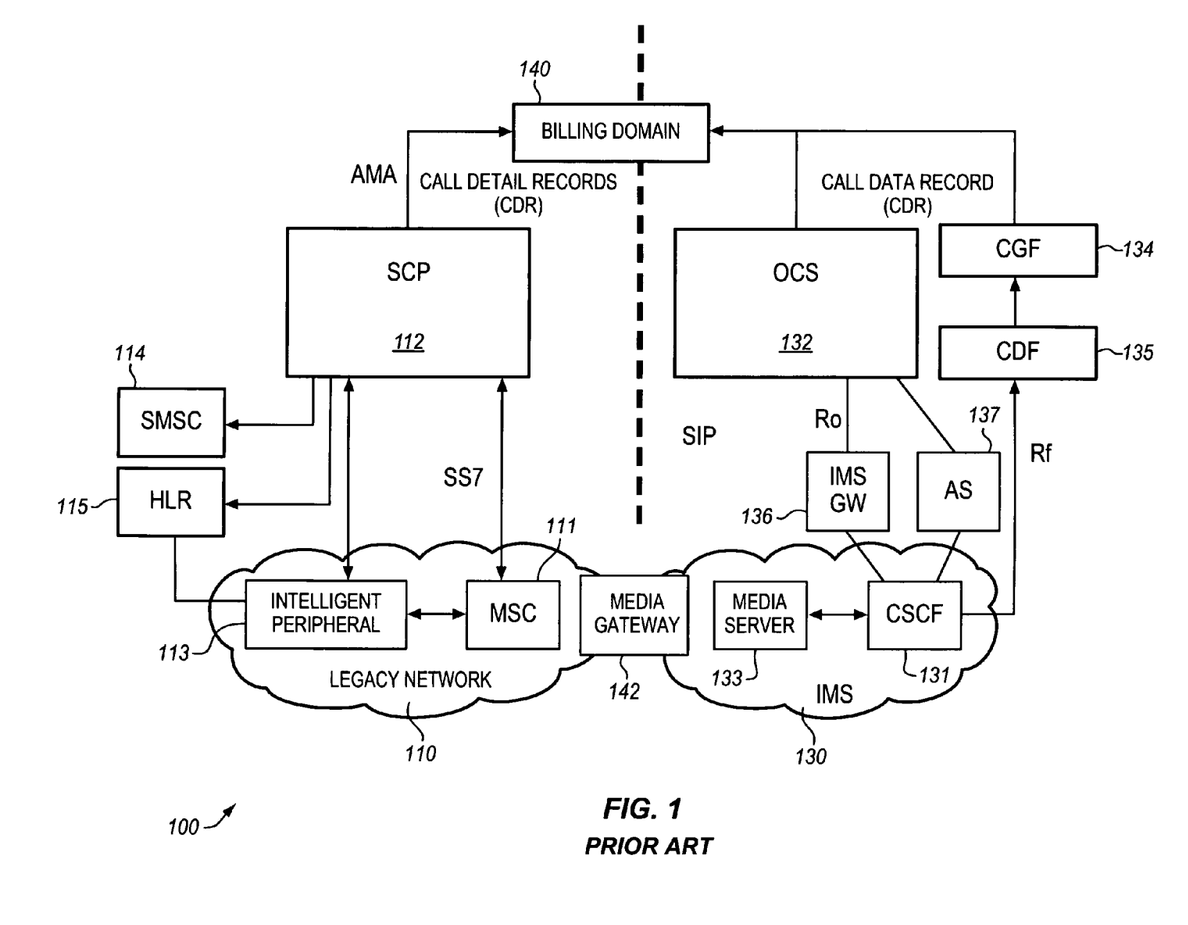
FIG. 1 illustrates a network architecture implementing both a legacy network and an IMS network in the prior art.

Service providers that operate one or more legacy networks may also implement new IMS networks. FIG. 1 illustrates a network architecture 100 implementing both a legacy network 110 and an IMS network 130 in the prior art. Legacy network 110 includes a Mobile Switching Center (MSC) 111, an intelligent network Service Control Point (SCP) 112, an intelligent peripheral 113, a Short Message Service Center (SMSC) 114, and a Home Location Register (HLR) 115. IMS network 130 includes a Call Session Control Function (CSCF) 131, an Online Charging System (OCS) 132, a media server 133, a Charging Gateway Function (CGF) 134, a Charging Data Function (CDF) 135, an IMS gateway function 136, and a Service Control Application Server (AS) 137. SCP 112, MSC 111, OCS 132, and CGF 134 communicate with billing domain 140. Billing domain 140 typically comprises Call Detail Record and Charging Data Record post-processing systems such as the operator's billing system or billing mediation device. Media gateway 142 may terminate bearer channels from a switched circuit network and media streams from a packet network. Media gateway 142 may support media conversion, bearer control, and payload processing, such as encoding/decoding, echo canceling, or a conference bridge.

MSC 111 is a switching element for legacy network 110. SCP 112 provides service control functions, account management, charging and rating functions, and notification functions for legacy network 110. Intelligent peripheral 113 is a physical entity that implements Intelligent Network specialized resource functions, such as voice announcements. SMSC 114 is adapted to transfer short message notification to a mobile subscriber via Short Message Delivery Point-to-Point format. HLR 115 is responsible for managing mobile subscribers. HLR 115 stores and manages subscriber information, and part of the mobile information that allows incoming calls to be routed to the mobile subscriber.

Service control in legacy network 110 is traditionally performed in SCP 112. As an example, assume MSC 111 receives signaling for a call from a mobile subscriber (not shown). If the call requires intelligent services, such as for a pre-paid call, MSC 111 queries SCP 112 for service control. SCP 112 includes a charging and rating function that determines whether the mobile subscriber has units left in his/her account to place the call, requests units for the call, etc. If an announcement is needed, such as to inform the mobile subscriber of the number of minutes left in his/her account, then SCP 112 may instruct intelligent peripheral 113 to play an announcement to the mobile subscriber. If a text message is needed, then SCP 112 may instruct SMSC 114 to transmit a text message to the mobile subscriber. After providing the needed services, SCP 112 responds to MSC 111 with routing instructions for the call. SCP 112 also reports to billing domain 140 regarding charging for the call.

In IMS network 130, CSCF 131 serves as a centralized routing engine, policy manager, and policy enforcement point to facilitate the delivery of multiple real-time applications using IP transport. OCS 132 provides online charging for IMS network 130. Online charging is a process where charging information for network resource usage is collected concurrently with resource usage, but authorization of the network resource usage must be obtained by the network prior to the actual resource usage. CGF 134 and CDF 135 provide offline charging for IMS network 130. Offline charging is a process where charging information for network resource usage is collected concurrently with the resource usage. At the end of this process, Charging Detail Records (CDRs) are generated and transferred to billing domain 140. Media server 133 provides a wide range of functions for multimedia resources, including provision of resources, mixing of incoming media streams, sourcing media streams (for multimedia announcements), and processing of media streams. IMS gateway 136 is an interface between CSCF 131 and OCS 132. Service control AS 137 provides service control as desired.

Service control in IMS network 130 is performed in service control AS 137 and IMS gateway 136. As an example, assume CSCF 131 receives a SIP INVITE message to initiate a call session from a subscriber. If the call is a pre-paid call, then CSCF 131 transmits SIP messages to IMS gateway 136 for service control. IMS gateway 136 and/or AS 137 queries OCS 132 for charging and rating for the call. If an announcement is need, such as to inform the mobile subscriber of the number of minutes left in his/her account, then IMS gateway 136 and/or AS 137 may instruct media server 133 to play an announcement to the mobile subscriber. OCS 132 also reports to billing domain 140 regarding charging for the call.

Figure 2:
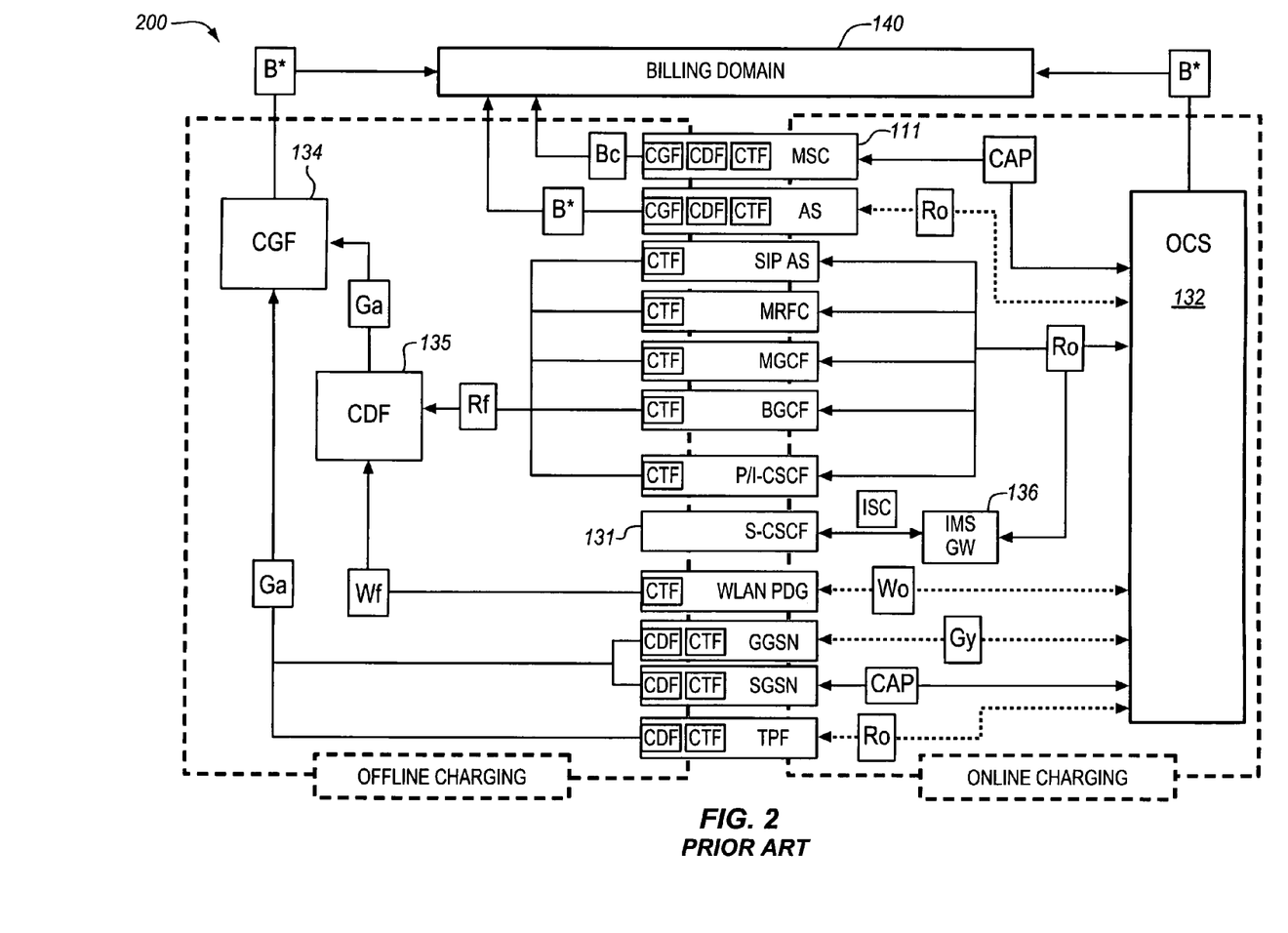
FIG. 2 illustrates a 3GPP charging architecture in the prior art.

FIG. 2 illustrates a charging architecture 200 suggested by the 3GPP in the prior art. For IMS network 130, CSCF 131 (labeled S-CSCF in FIG. 2) connects to IMS gateway 136 through an ISC interface and IMS gateway 136 connects to OCS 132 through the Ro interface for online charging (see also FIG. 1). CSCF 131 connects to CDF 135 through the Rf interface (such as through the P/I CSCF) for offline charging. For legacy network 110, MSC 111 may connect to OCS 132 through a CAMEL Application Part (CAP) interface for online charging (in GSM networks). MSC 111 may connect to billing domain 140 through a Bc interface. Other features and connections of charging architecture 200 are known to those familiar with the 3GPP architecture and will not be discussed in detail.

One problem for services providers is having separate service control and separate charging when implementing both legacy networks and IMS networks. If new services and new service control are implemented, the separate service control functions in the different networks have to be updated. Further, if charging or rating functions need to be updated, the separate charging functions of the different networks need to be updated. Further, if there are separate service controls, the services will generate charging data records (CDR) in different formats, which will cause the billing domain to have to consolidate and reformat the CDRs. Updating and maintaining separate service control functions and separate charging functions can be costly and time consuming.

SUMMARY OF THE SOLUTION

The invention solves the above and other related problems by converging service control for one or more legacy networks and an IMS network. Another feature of the invention is convergence of charging of the different networks. The convergence of service control and charging allows for real-time control over different networks through a common system. The convergence of service control and charging saves the service providers operation and maintenance costs when operating different networks.

One embodiment of the invention includes a converged service control system comprising a protocol interface and a service controller. The converged service control system is in communication with a legacy network and an IMS network. Examples of the legacy network include a wireline telecommunications network (PSTN), a CDMA network, and a GSM network. When in operation, protocol interface receives call messages from the legacy network in a first protocol. The call messages are for one or more calls in the legacy network. The protocol interface converts the call messages in the first protocol to a common protocol used by the converged service control system. The service controller receives the call messages in the common protocol for the legacy network, and processes the call messages in the common protocol to provide IN service control for the legacy network.

Concurrently, the protocol interface receives call messages from the IMS network in a second protocol. The call messages are for one or more calls (sessions) in the IMS network. The protocol interface converts the call messages in the second protocol to the common protocol used by the converged service control system. The service controller receives the call messages in the common protocol for the IMS network, and processes the call messages in the common protocol to provide IN service control for the IMS network.

The converged service control system advantageously converges service control for both the legacy network and the IMS network into a single system. The converged solution allows for more cost effective operation and maintenance of the service control functionality of both networks.

In another embodiment of the invention, the converged service control system further includes an online charging interface and an offline charging interface. To handle charging for calls, the service controller generates charging messages to provide online charging and offline charging for the legacy network and the IMS network. If online charging is needed for calls in either the legacy network or the IMS network, the online charging interface transmits the charging messages generated by the service controller to an online charging system. If offline charging is needed for calls in either the legacy network or the IMS network, the offline charging interface transmits the charging messages generated by the service controller to an offline charging system.

In another embodiment of the invention, the converged service control system further includes a notification system. To handle notification, such as providing announcements for a pre-paid call, the service controller generates notification messages to provide notification to subscribers in the legacy network and the IMS network. If notification is needed for calls in the legacy network, then the notification system controls an intelligent peripheral or text message server to provide notification to subscribers in the legacy network. If notification is needed for calls in the IMS network, then the notification system controls a media server to provide notification to subscribers in the IMS network.

The invention may include other exemplary embodiments described below.

DESCRIPTION OF THE DRAWINGS

The same reference number represents the same element on all drawings.

DETAILED DESCRIPTION OF THE INVENTION

FIGS. 3-9 and the following description depict specific exemplary embodiments of the invention to teach those skilled in the art how to make and use the invention. For the purpose of teaching inventive principles, some conventional aspects of the invention have been simplified or omitted.

Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 3:
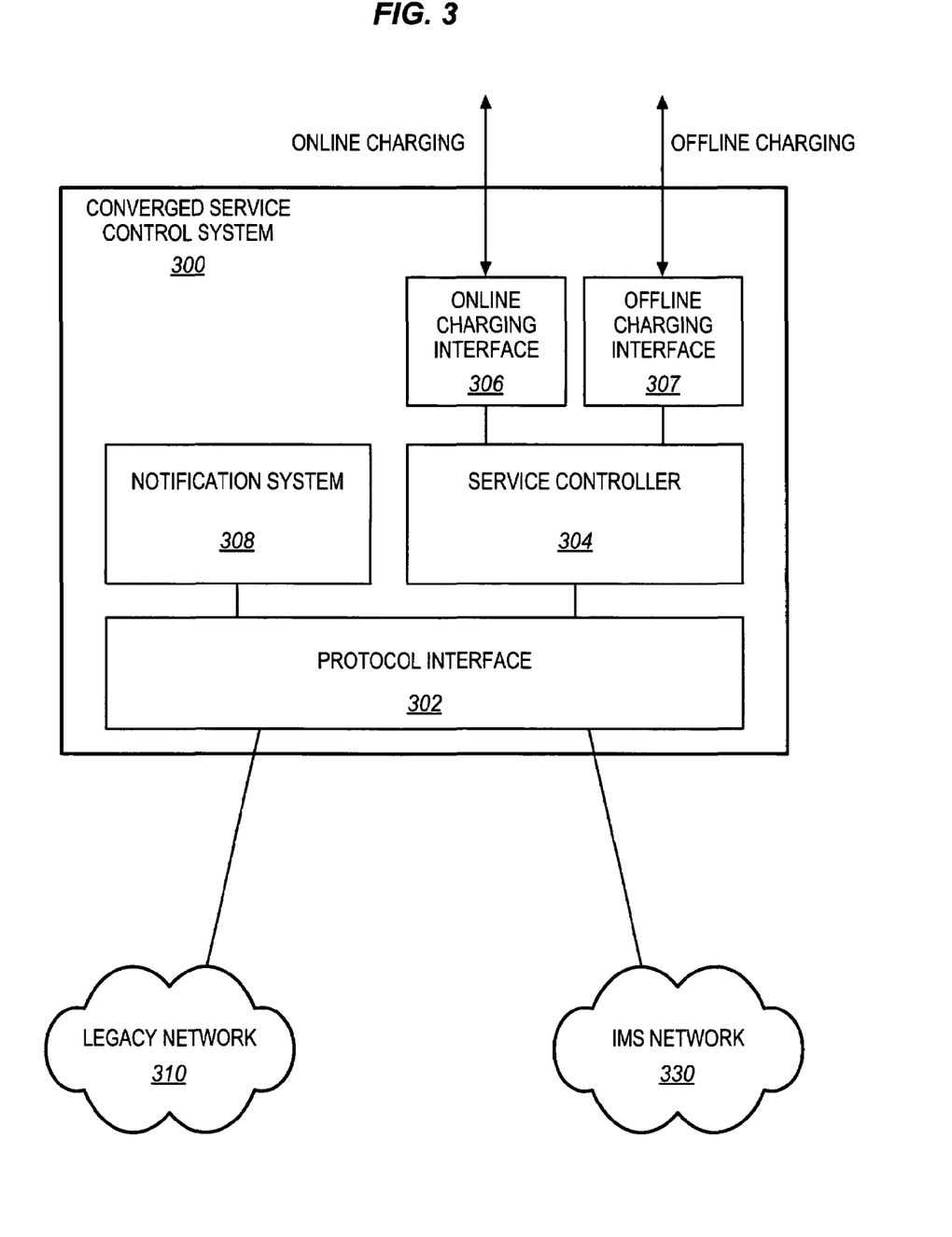
FIG. 3 illustrates a converged service control system in an exemplary embodiment of the invention.

FIG. 3 illustrates a converged service control system 300 in an exemplary embodiment of the invention. Converged service control system 300 includes a protocol interface 302, a service controller 304, an online charging interface 306, an offline charging interface 307, and a notification system 308. Converged service control system 300 may include other devices, components, or systems not shown for the sake of brevity.

Converged service control system 300 is in communication with a legacy network 310 and an IMS network 330. Legacy network 310 comprises any non-IMS network providing intelligent network services. Examples of legacy network 310 include a wireline telecommunications network (PSTN), a CDMA network, and a GSM network. Converged service control system 300 may be in communication with multiple legacy networks and multiple IMS networks.

Subscribers (not shown) of legacy network 310 place calls requiring intelligent network (IN) service control. Responsive to such calls, devices (e.g., a switch or an MSC) in legacy network 310 transmit call messages to converged service control system 300 to receive service control for the calls. Call messages comprise any messages used for call control or service control in a legacy network or an IMS network. In this instance, the call messages received from legacy network 310 are in a first protocol used by legacy network 310. For instance, if legacy network 310 comprises a PSTN, then a switch in the PSTN may transmit the call messages in INAP Capability Set 1 (CS1) protocol. If legacy network 310 comprises a CDMA network, then an MSC in the CDMA network may transmit the call messages in IS826 protocol.

Likewise, subscribers (not shown) of IMS network 330 place calls requiring intelligent network (IN) service control. The term "calls" as used to describe IMS network 330 is meant to refer to call sessions and other multimedia sessions commonly established in IMS networks. Responsive to such calls, functions (e.g., CSCF) in IMS network 330 transmit call messages to converged service control system 300 to receive service control for the calls. The call messages received from IMS network 330 are in a second protocol used by IMS network 330. For instance, the CSCF in IMS network 330 may transmit the call messages in SIP protocol.

Protocol interface 302 receives the call messages from legacy network 310 in the first protocol. Protocol interface 302 converts the call messages in the first protocol to a common protocol used by converged service control system 300. The common protocol may be one of many desired protocols. Service controller 304 receives the call messages in the common protocol for legacy network 310 from protocol interface 302. Service controller 304 processes the call messages in the common protocol to provide IN service control for legacy network 310. IN service control is known to those skilled in the art. Examples of IN service control include, but are not limited to, 800-number routing service, pre-paid service, voice mail routing service, abbreviated dialing service, and notification. Service control may alternatively be referred to as intelligent network (IN) call control.

Concurrently, protocol interface 302 receives the call messages from IMS network 330 in the second protocol. Protocol interface 302 converts the call messages in the second protocol to the common protocol used by converged service control system 300. Service controller 304 receives the call messages in the common protocol for IMS network 330 from protocol interface 302. Service controller 304 processes the call messages in the common protocol to provide IN service control for IMS network 330.

According to further aspects and features hereof, service controller 304 generates charging messages to provide online charging and offline charging for legacy network 310 and IMS network 330. During service control for calls in legacy network 310, if service controller 304 determines that online charging is to be applied for the calls, then service controller 304 generates online charging messages. Online charging messages comprise any messages used for online charging, such as requests for a quota, requests for call rating, etc. Online charging interface 306 receives the online charging messages and transmits the online charging messages to an Online Charging System (OCS) (not shown). Online charging interface 306 may comprise a Diameter Ro interface or any other charging interface. If service controller 304 determines that offline charging is to be applied for the calls, then service controller 304 generates offline charging messages. Offline charging messages comprise any messages used for offline charging. Offline charging interface 307 receives the offline charging messages and transmits the offline charging messages to an offline charging system (not shown). Offline charging interface 307 may comprise a Diameter Rf interface or any other charging interface.

Similarly, during service control for calls in IMS network 330, if service controller 304 determines that online charging is to be applied for the calls, then service controller 304 generates online charging messages. Online charging interface 306 receives the online charging messages and transmits the online charging messages to the OCS. If service controller 304 determines that offline charging is to be applied for the calls, then service controller 304 generates offline charging messages. Offline charging interface 307 receives the offline charging messages and transmits the offline charging messages to the offline charging system.

According to further aspects and features hereof, service controller 304 generates notification messages to provide notification to subscribers in legacy network 310 and IMS network 330. Notification comprises any manner of providing information to subscribers of legacy network 310 and IMS network 330. Notification maybe pre-call, mid-call, or post-call. Examples of notification include providing text, voice, or multimedia information to subscribers. For instance, notification may be a voice announcement to inform a subscriber of how much time is left in his/her pre-paid account.

During service control for calls in legacy network 310, if service controller 304 determines that notification is required, service controller 304 generates notification messages. The notification messages may not be the actual messages transmitted to a subscriber, but may rather be instructions to provide notification. Notification system 308 receives the notification messages for legacy network 310, and controls an intelligent peripheral (not shown) in legacy network 310 to provide notification to subscribers of legacy network 310. For instance, the notification provided by the intelligent peripheral may comprise an announcement to a subscriber. Notification system 308 may alternatively control a text message server (not shown) in legacy network 310, such as a Short Message Service Center (SMSC), to provide notification to subscribers of legacy network 310.

Similarly, during service control for calls in IMS network 330, if service controller 304 determines that notification is required, service controller 304 generates notification messages. Notification system 308 receives the notification messages for IMS network 330, and controls a media server (not shown) in IMS network 330 to provide notification to subscribers of IMS network 330. For instance, the notification provided by the media server may comprise a voice announcement or multimedia message to a subscriber.

Converged service control system 300 may be implemented as software, hardware, or a combination of hardware and software. In a software implementation, converged service control system may be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accordance with the invention. The term "processing system" refers to a single processing device or a group of inter-operational processing devices. Some examples of processors are computers, integrated circuits, and logic circuitry. Those skilled in the art are familiar with instructions, processors, and storage media. Converged service control system 300 may be implemented in a single network node or may be distributed among multiple network nodes.

With IMS converging different access technologies with a common multimedia packet core network, converged service control system 300 enables the convergence of the service control of multiple networks and enables the online/offline charging systems to converge charging solutions for bearer layer, IMS subsystem layer, and service layer for both legacy network 310 and IMS network 330 with the capability of real-time control over the different networks.

Figure 4:
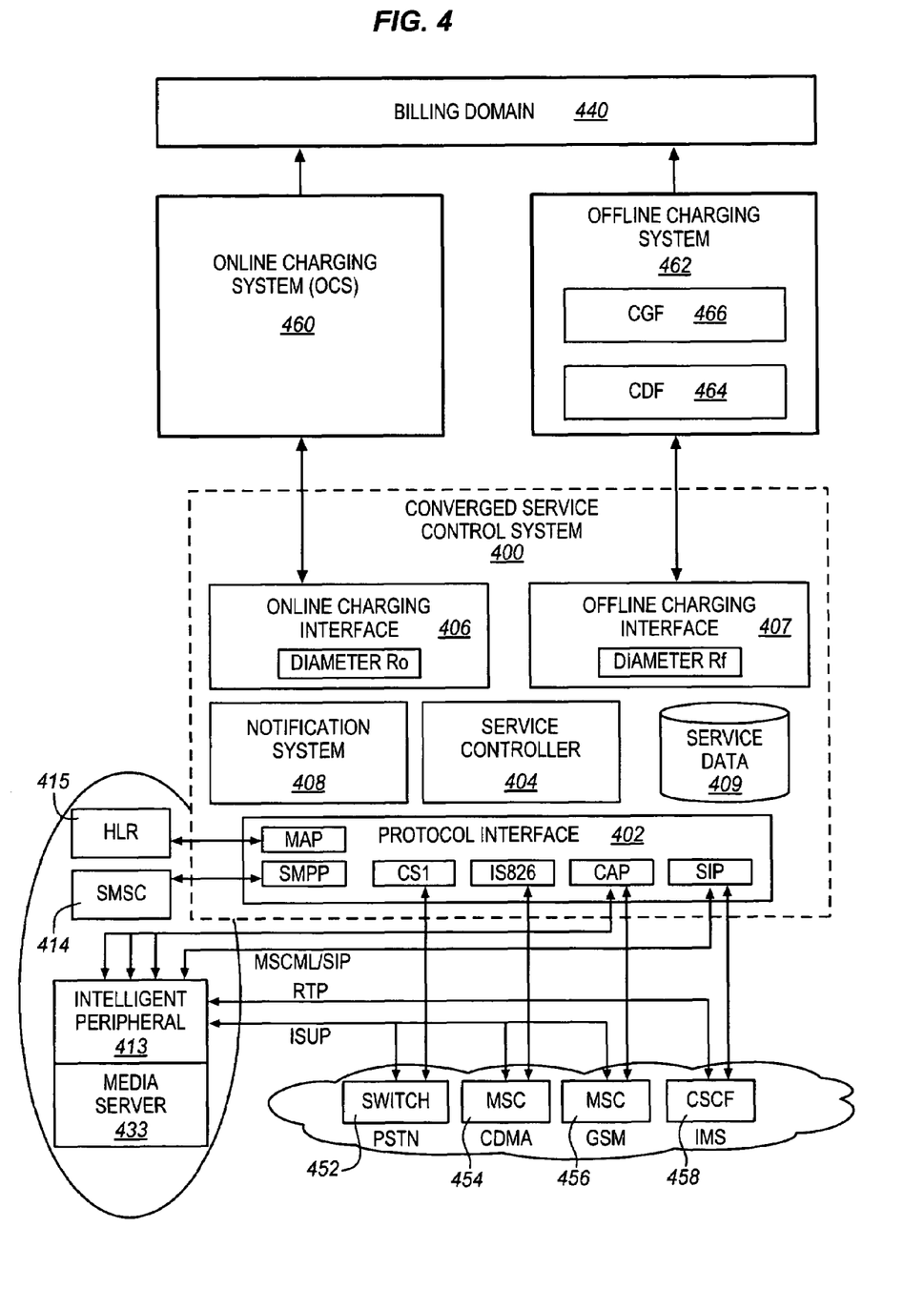
FIG. 4 illustrates a more detailed embodiment of a converged service control system in an exemplary embodiment of the invention.

FIG. 4 illustrates a more detailed embodiment of a converged service control system 400 in an exemplary embodiment of the invention. Converged service control system 400 includes a protocol interface 402, a service controller 404, an online charging interface 406, an offline charging interface 407, and a notification system 408 similar to that described in FIG. 3. Converged service control system 400 further includes a service data database 409 that stores any data used for service control and to provide services. Converged service control system 400 is in communication with a plurality of legacy networks and an IMS network. The legacy networks are represented by a switch 452 of a PSTN, an MSC 454 of a CDMA network, and an MSC 456 of a GSM network. The IMS network is represented by a CSCF 458.

Protocol interface 402 includes an INAP Capability Set 1 (CS1) protocol layer to communicate with switch 452. Protocol interface 402 includes an IS826 protocol layer to communicate with MSC 454. Protocol interface 402 includes a CAMEL Application Part (CAP) protocol layer to communicate with MSC 456. These protocol layers are also used to communicate with one or more intelligent peripherals 413 in the legacy network.

Protocol interface 402 includes a SIP protocol layer to communicate with CSCF 548. The SIP protocol layer may also be used to communicate with one or more media servers 433 of the IMS network.

Protocol interface 402 also includes a Mobile Application Part (MAP) protocol layer to communicate with an HLR 415 of the legacy network. Protocol interface 402 also includes Short Message Peer-to-Peer (SMPP) protocol layer to communicate with a Short Message Service Center (SMSC) 414 of the legacy network.

Online charging interface 406 comprises a Diameter Ro interface in this embodiment. Online charging interface 406 communicates with an Online Charging System (OCS) 460. Online charging is a process where charging information for network resource usage is collected concurrently with that resource usage. However, authorization of the network resource usage must be obtained by the network prior to the actual resource usage. This authorization is granted by OCS 460 upon request from the converged service control system 400.

Offline charging interface 407 comprises a Diameter Rf interface in this embodiment. Offline charging interface 407 communicates with an offline charging system 462. Offline charging system 462 includes a charging data function (CDF) 464 and a charging gateway function (CGF) 466. Offline charging is a process where charging information for network resource usage is collected concurrently with the resource usage. At the end of the offline charging process, offline charging system 462 transmits CDRs to a billing domain. Converged service control system 400 acts as the Charging Trigger Function (CTF) to support convergent offline charging for both the legacy networks and the IMS network via a standard Diameter Rf interface.

Online charging system 460 and offline charging system 462 communicate with a billing domain 440. Billing domain 440 typically comprises Call Detail Record and Charging Data Record post-processing systems such as the operator's billing system or billing mediation device. In offline charging, resource usage is reported from the network to billing domain 440 after the resource usage has occurred. In online charging, OCS 460 can monitor the resource usage in real-time, and a rated CDR is transferred to billing domain 440 for reporting and analysis.

Converged service control system 400 operates as described in FIG. 3 to provide service control and charging for the legacy networks and the IMS network. Converged service control system 400 combines service control capabilities for different services, e.g. voice, data, and multimedia, on both the legacy networks and the IMS network, and supports both online charging and offline charging. In the legacy networks, converged service control system 400 acts as IN Service Control Point (SCP). In the IMS network, converged service control system 400 acts as a Service Control Application Server (AS) and an IMS gateway function (IMS GW). Converged service control system 400 enables the subscribers of the IMS network to receive traditional IN services, such as 800-number service, calling card service, etc, and enables the service provider's Online Charging System (OCS) 460 and offline charging systems 462 to support both the legacy networks and the IMS network with seamless correlation of bearer and service layer charging with little integration effort by maintaining unified online/offline charging protocols through the Diameter Ro and Diameter Rf interfaces. Various IN protocols or service control signaling are fully handled by converged service control system 400 with abundant reusable services (i.e. the traditional IN services are available for the SIP subscribers for Voice over IP (VoIP) calls). New service control protocols in OCS 460 and offline charging system 462 will have minimum impact with full charging capability reuse due to the unified standard charging interface application. In other words, new charging/rating/balance management functionality enhancements in OCS 460 or CDF 464/CGF 466 can benefit all networks supported by converged service control system 400.

Converged service control system 400 provides the service providers with real-time services during the lifecycle of the call from the start of the call to the release of the call. Examples of the services provided include call screening, advanced routing (800-number routing, Abbreviated Dialing, etc), 3$^{rd}$ party access, real-time notification to subscribers, pre-paid or calling card service, etc.

Converged service control system 400 supports the traditional services realized by the IN from SIP subscribers for IP-host-to-phone calls. Whether the call is originated in either the legacy networks or the IMS network, the services are provided by the data and procedures resident in converged service control system 400.

Converged service control system 400 further enables the service providers to support unified real-time online/offline charging capability for calls on different network environments. Combined with OCS 460, converged service control system 400 can support the session based online charging capability by continuously reserving service units from OCS 460 during a call. If the credit is exhausted during the call, converged service control system 400 terminates the call using a release message of the service control protocols. Converged service control system 400 can support the event based online charging capability for services having a surcharge, such as Abbreviated Dialing (ABD). For example, in addition to the normal time-based call charge, abbreviated dialing calls are charged a surcharge. Converged service control system 400 transmits a Diameter Ro event-based charging request to OCS 460 to indicate an abbreviated dialing surcharge for the call. OCS 460 then determines how much should be charged to the balance of the subscriber.

Combined with offline charging system 462, converged service control system 400 can also support real-time offline charging capability. Converged service control system 400 can convert the real-time service control protocols, such as IN protocols and SIP protocols, to a standard offline charging protocol such as the Diameter Rf. CDF 464 can generate Charging Data Records (CDR) based on the offline charging protocol. This invention conveys the charging information of circuit-based voice calls in the Diameter Attribute Value Pair (AVP) Service-Parameter-Info to keep good flexibility for the interface.

To play the real-time voice notification and provide Interactive Voice Response (IVR) for calling card service, converged service control system 400 provides interworking with different media resource functions, such as an intelligent peripheral in a legacy network, an SMSC in the legacy network, or a media server in the IMS network, to adapt to multiple network environment needs. Converged service control system 400 can control an intelligent peripheral through IN protocols, such as INAP CS1 and IS771. Converged service control system 400 can also control a media server through SIP.

Converged service control system 400 provides the following real-time service control capabilities that are available to wireline subscribers, wireless subscribers, and SIP subscribers. Other service control capabilities may be available as desired.

One service is 800-number routing (free phone) service. For 800-number service, converged service control system 400 translates the 800-number to the actual routing number based on the location of the access point. The telephone in the legacy network and SIP end points in the IMS network can fully share the same 800-number repositories and service.

Another service is Abbreviated Dialing. The abbreviated dialing function allows end users to subscribe to a list of abbreviated dialing codes associated with frequently called destination numbers. When subscribers select the abbreviated dialing option from menu access, they are offered a personalized menu choice of up to 10 destination numbers that can be dialed with a single digit. If a subscriber accesses this feature via a short code, then there is a system abbreviated dialing number and a subscriber abbreviated dialing number associated with the short code. The system abbreviated dialing number is specified by service provider and the subscriber abbreviated dialing number is specified by the subscriber.

Another service is a help desk call. A subscriber can make a call to a Help Desk when needing help. Converged service control system 400 plays a standard announcement to the subscriber to indicate that the call is being routed to the Help Desk and the call is connected to a Help Desk number provisioned by the service provider. If a Help Desk online charge has been provisioned, then converged service control system 400 sends a real-time charge request to OCS 460 to apply the charge to the subscriber's account.

Another service is voice mail handling. Service providers can specify the voice mail digits in converged service control system 400. The specified routing numbers replace the dialed numbers when subscribers dial their voice mail short code or their own telephone numbers to retrieve the voice mails, or when an incoming call is routed to the subscriber's voice mail system for voice mail deposit.

Another service is notification to subscribers. Converged service control system 400 supports various end user notification methods. The service providers can specify the method of notification, such as SMS, voice announcement, or USSD text, and the call points, such as pre-call, mid-call, or post-call, associated with the notification. In addition, converged service control system 400 supports multilingual variable complex type notification, such as time, duration, money, etc.

Another service is third party access/calling card service. Converged service control system 400 supports third party access for wireless subscribers, wireline subscribers, and SIP subscribers. This feature can be used in cases where the subscriber's mobile phone cannot be used, in cases where the subscriber wishes to use a wireline phone but have the call charged to their prepaid account, or in cases where the account is a calling card account that can be used to make calls. When subscribers dial a specified access number, they are connected using third party access. Subscribers are then prompted for their prepaid/calling card account ID and PIN. After successful completion of the authentication procedure, users can dial a destination to make the call and apply online charges to their prepaid/calling card account in OCS 460. Menu options can be accessed through the same number, such as to change the PIN, to recharge the account in OCS 460, to request account information, or to transfer balance from/to another account. If an invalid account ID or associated PIN is entered, then the subscribers will hear an appropriate terminating announcement or be connected to the Help Desk.

Figure 5:
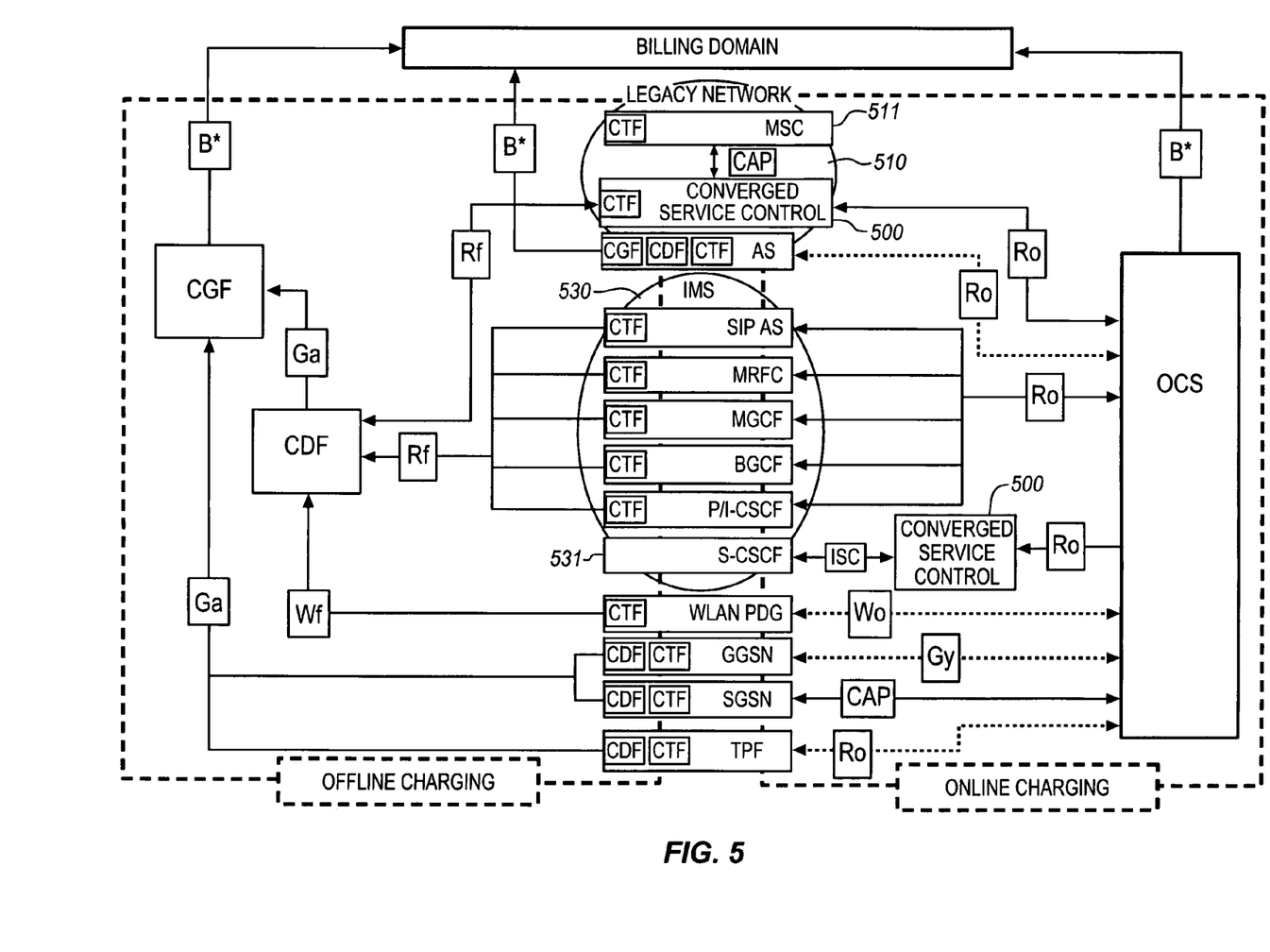
FIG. 5 illustrates how a converged service control system of the invention fits into the 3GPP charging architecture.

FIG. 5 illustrates how a converged service control system 500 of the invention fits into the 3GPP charging architecture. Converged service control system 500 may be implemented as converged service control system 300 of FIG. 3 or converged service control system 400 of FIG. 4. In FIG. 5, legacy network 510 includes an MSC 511. MSC 511 connects to converged service control system 500 through a CAP interface. Converged service control system 500 provides online charging for legacy network 510 through Ro interface, and provides offline charging for legacy network 510 through Rf interface.

IMS network 530 includes an S-CSCF 531. S-CSCF 531 connects to converged service control system 500 through an ISC interface. Converged service control system 500 provides online charging for IMS network 530 through Ro interface. In FIG. 5, IMS nodes (not shown), such as an Application Server, will be embedded with Charging Trigger Functions (CTF) for offline charging. Thus, converged service control system 500 will not be involved in IMS offline charging. If the IMS nodes do not support the CTF and the Rf interface, they can send SIP/SDP messages to converged service control system 500. Converged service control system 500 will then act as the CTF and will convert the SIP/SDP messages to a common protocol for offline charging.

Figure 6:
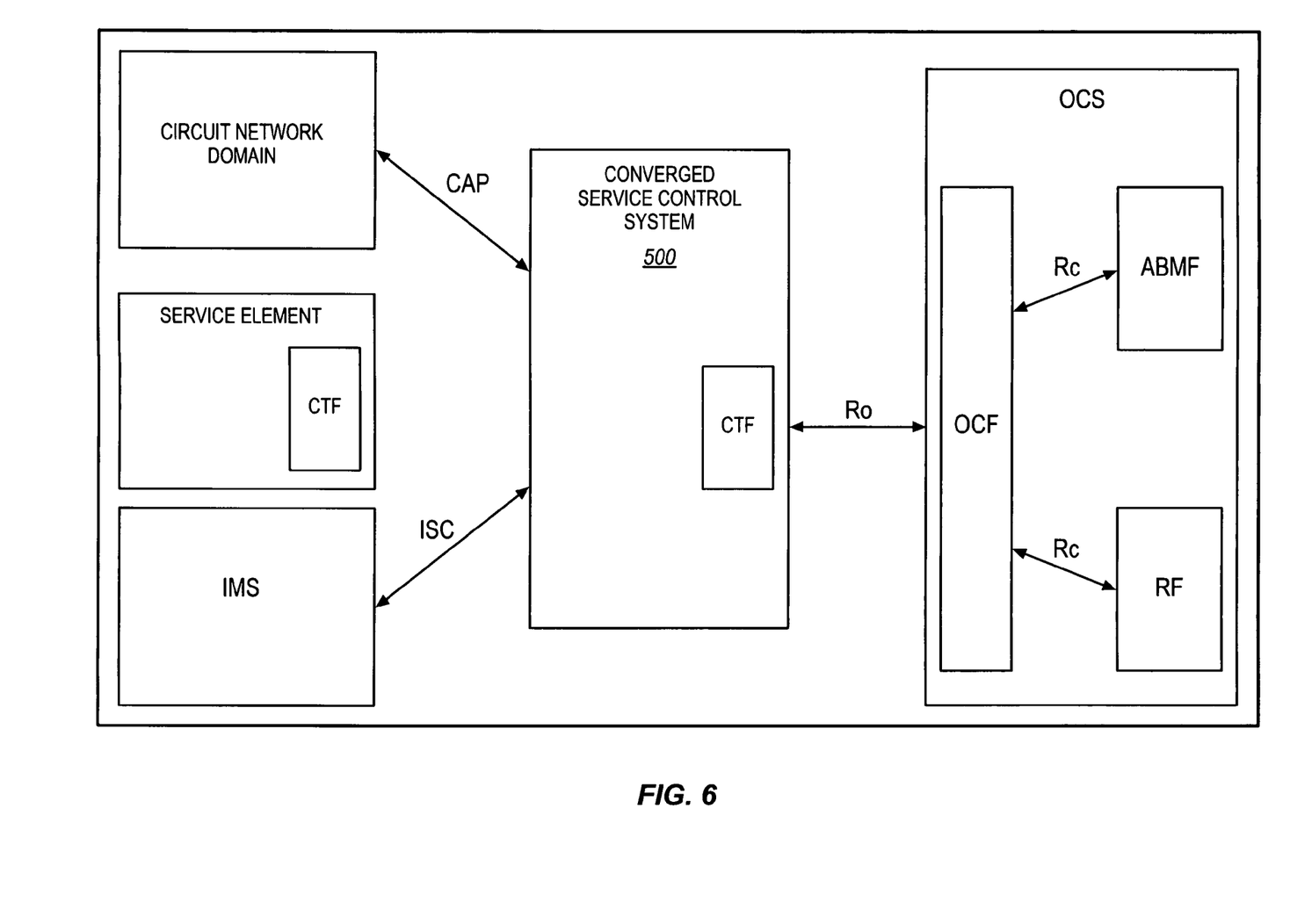
FIGS. 6-7 illustrate how a converged service control system of the invention fits into the 3GPP online charging architecture.
Figure 7:
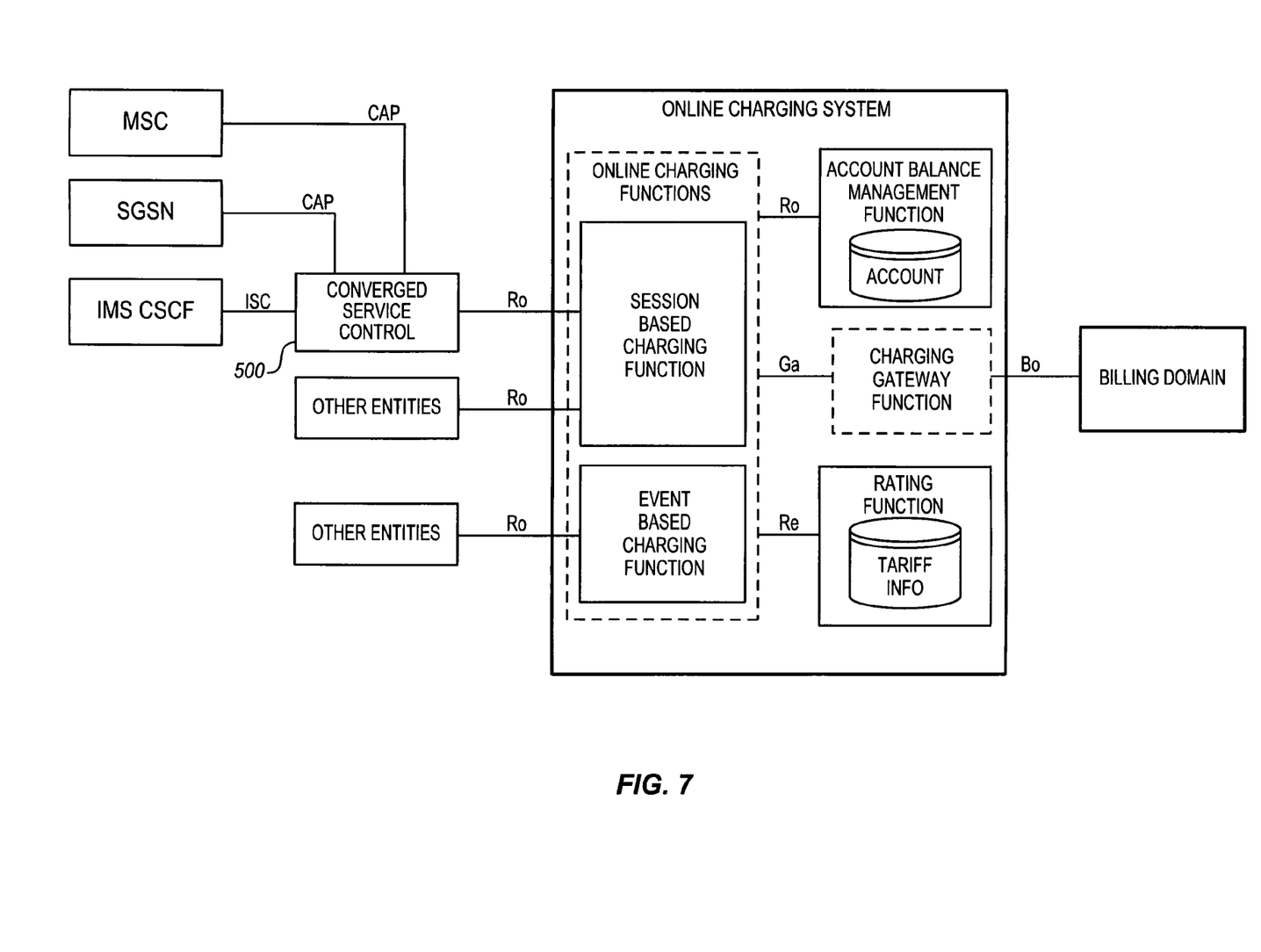

FIGS. 6-7 further illustrate how converged service control system 500 fits into the 3GPP online charging architecture. Converged service control system 500 enables the OCS to support charging for both legacy networks and IMS networks through the Diameter Ro interface. When receiving a network resource usage request via IN protocols or the ISC interface, converged service control system 500 assembles the relevant charging information and generates a charging event towards the OCS in real time. The OCS then returns an appropriate usage authorization. The resource usage authorization is limited in its scope (e.g., volume of data or duration), so the authorization has to be renewed from time to time by converged service control system 500 as long as the user requests the network resource usage. Converged service control system 500 enables the OCS to support charging for the legacy network through the Ro interface.

For an IMS network, the S-CSCF supports online charging using the ISC interface if the application server addressed over the ISC is the IMS Gateway Function, or using the Ro interface directly instead of the ISC, if the IMS Gateway Function is integrated within the S-CSCF. The support of ISC as the charging interface towards the CSCF requires additional functionality to be provided by the OCS. The support of Ro as the charging interface towards the OCS requires additional functionality to be provided by the CSCF.

By introducing converged service control system 500 as the IMS charging gateway between the CSCF and the OCS to translate the ISC interface to standard charging interface Ro, service providers can easily support IMS session charging by the OCS as demonstrated in FIGS. 6-7. In addition, the OCS only needs to support a unique Ro interface to provide online charging service for different networks.

Figure 8:
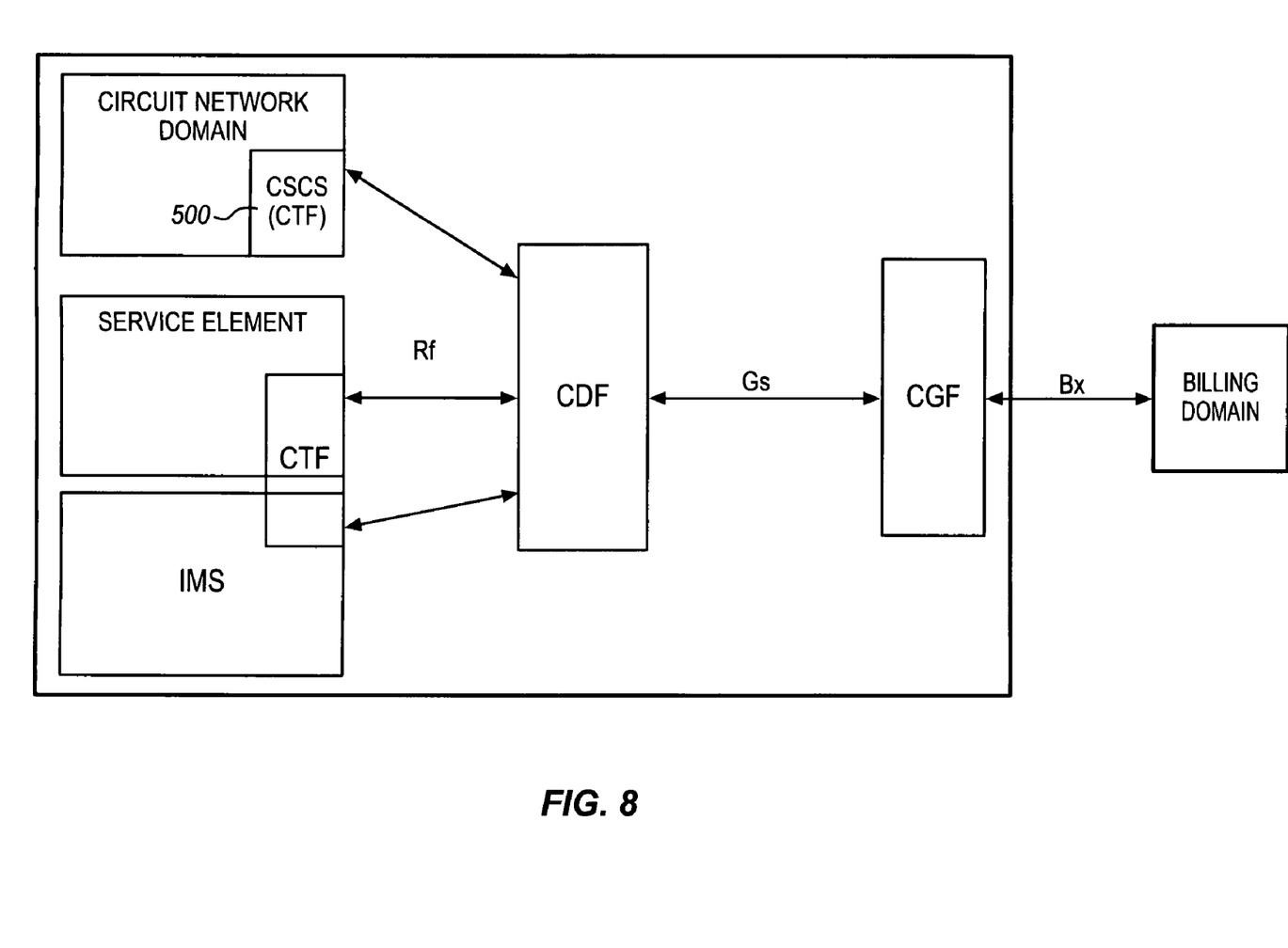
FIG. 8 illustrates how a converged service control system of the invention fits into the 3GPP offline charging architecture.

FIG. 8 illustrates how converged service control system 500 fits into the 3GPP offline charging architecture. The offline charging system comprises the Charging Data Function (CDF) and Charging Gateway Function (CGF). Converged service control system (CSCS) 500 includes the Charging Trigger Function (CTF) to translate traditional IN protocols to Rf and minimizes the impact to the legacy networks. The arrows depict the direction of the charging information flow, where the Rf interface transfers charging events, the Ga interface transfers CDRs, and the Bx interface transfers CDR files.

For IMS offline charging, the offline charging functionality is based on the IMS network nodes reporting accounting information upon reception of various SIP messages or ISUP messages, as most of the accounting relevant information is contained in these messages. This reporting is achieved by sending Diameter accounting request (ACR) messages (start, interim, stop, and event) from the IMS network elements to the CDF. Based on real-time IN protocols, ISUP or SIP, converged service control system 500 supports the real-time offline charging interface Rf to send the call charging request to the offline charging system with the full resource usage information. The offline charging system will generate charging data records (CDR) and transfer the CDR files to billing domain.

Figure 9:
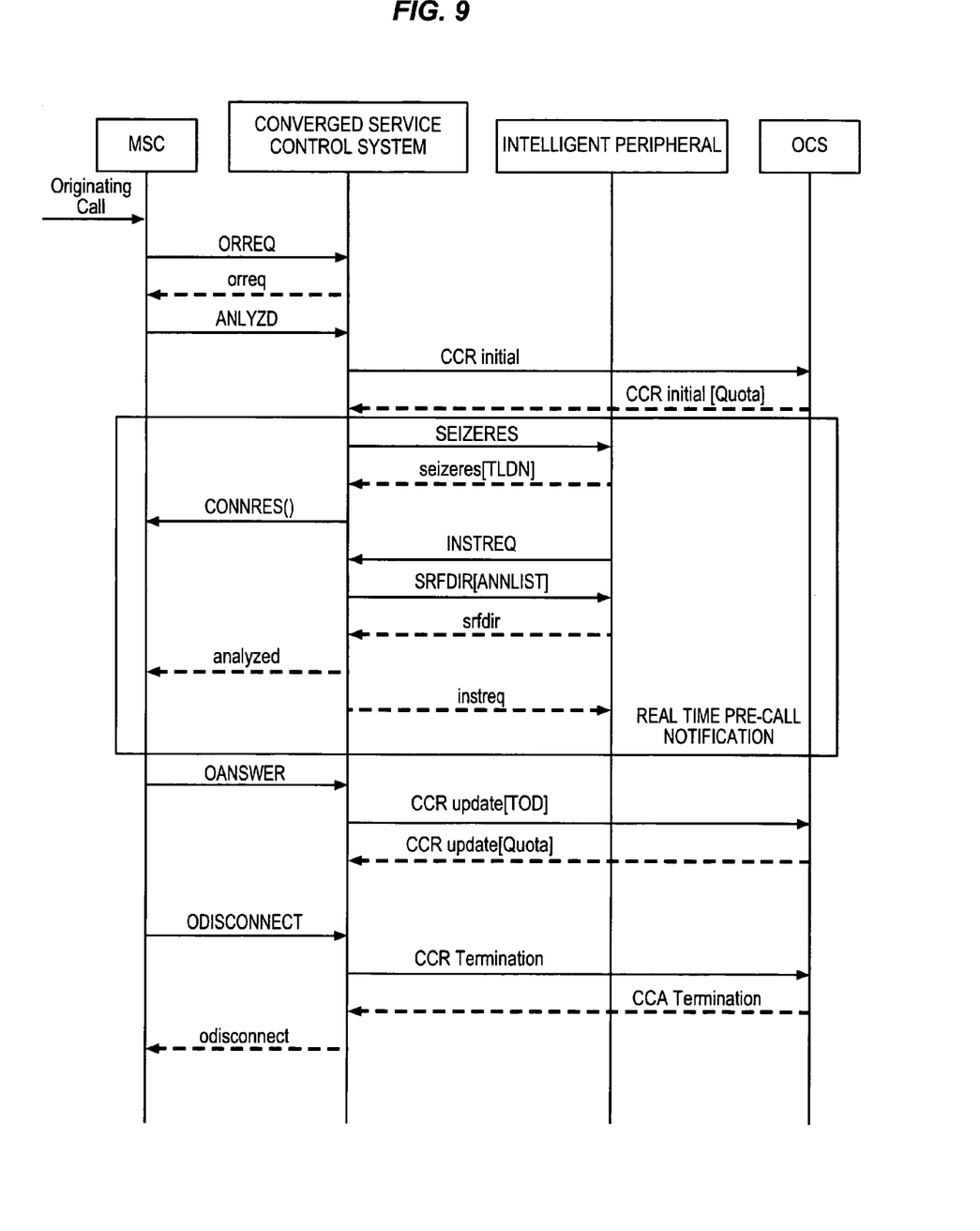
FIG. 9 is a message diagram illustrating a call scenario in an exemplary embodiment of the invention.

FIG. 9 is a message diagram illustrating a call scenario in an exemplary embodiment of the invention. The call scenario illustrates the operation of a converged service control system, such as the ones described in FIGS. 3-4.

To begin, a serving MSC in the legacy network receives a call with dialed digits from a subscriber in a legacy network. The serving MSC detects the Origination_Attempt_Authorized trigger and transmits an ORREQ message to the converged service control system associated with this trigger. The converged service control system determines whether the subscriber is valid to make a call, and transmits an orreq message to the MSC to indicate that call processing shall continue. If location information is available in the orreq message, it is stored for location-based service control services, such as call screening, advanced routing, etc.

The MSC analyzes the dialed digits and prepares to route the call. The MSC detects the Calling_Routing_Address_Available trigger and transmits an ANLYZD message to the converged service control system associated with this trigger. At this point, the converged service control system can apply enriched services to the call, such as call screening, advanced routed, etc.

The converged service control system determines that the subscriber has online charging service active and transmits a Credit Control Request (CCR) Initial message to the Online Charging System (OCS) to initialize the charging session. The OCS determines that the subscriber's account balance is sufficient for the call to begin and reserves a quota for the call. The OCS transmits the granted quota and other charging/account information to the converged service control system in a Credit Control Answer (CCA) Initial message. The quota can be either volume of data or duration.

The converged service control system determines that services are needed for the call. More particularly, the converged service control system determines that the service is to play a pre-call announcement to notify the subscriber of the residual balance and the cost of the call. The converged service control system thus transmits a SEIZERES message to an Intelligent Peripheral (IP) in the legacy network to request the resource. Responsive to receiving the SEIZERES message, the IP allocates a TLDN to the appropriate resource. The IP then transmits a seizeres message to the converged service control system indicating the TLDN.

The converged service control system then transmits a CONNRES message to the MSC with instructions to set up a call leg to the IP using the TLDN. The MSC sets up the call leg to the IP. When the call is detected at the IP, the IP transmits an INSTREQ to the converged service control system as a request for processing instructions. The converged service control system transmits an SRFDIR to the IP with the ANNLIST/Execute Script parameter to indicate the announcement to play. The IP then plays the announcement indicated by the ANNLIST/Execute Script parameter.

After playing the announcement, the IP transmits an empty srfdir message to the converged service control system. The converged service control system transmits an anlyzd message to the MSC. Responsive to the anlyzd message, the MSC releases the call leg to the IP. The converged service control system transmits an instreq message to the IP to conclude the CSC-IP conversation.

The MSC then extends the call in the legacy network to the called party. Assume that the called party answers the call. The MSC detects the O_Answer trigger and transmits an OANSWER message to the converged service control system associated with this trigger. Upon receipt of the OANSWER message, the converged service control system sets the call start time and start timer based on the duration quota size returned in the CCA from the OCS. If the quota timer is has timed out, then the converged service control system transmits a CCR Update message to the OCS to request a new quota. The OCS determines a new rate and reserves a new quota for the call. The OCS then transmits the new quota to the converged service control system via a CCA Update message. The converged service control system re-starts the quota timer to monitor the call usage. The call is cut through and connected. This process may be repeated each time the granted quota is exhausted at the converged service control system.

Assume that the subscriber ends the call. The MSC detects the O_Disconnect trigger and transmits an ODISCONNECT message to the converged service control system associated with this trigger. Responsive to the ODISCONNECT message, the converged service control system determines the call usage and transmits a CCR Termination message to the OCS indicating the call usage. The OCS calculates the total call cost and applies the charges to the subscriber's account. The OCS responds to the converged service control system with a CCA Termination message. The converged service control system transmits an odisconnect message to the MSC. The MSC then releases the call.

Although specific embodiments were described herein, the scope of the invention is not limited to those specific embodiments. The scope of the invention is defined by the following claims and any equivalents thereof.

We claim:

1. A converged service control system, comprising:
   a protocol interface adapted to receive first call messages in a first protocol from a legacy network, and convert the first call messages in the first protocol to a common protocol; and
   a service controller adapted to receive the first call messages in the common protocol, and process the first call messages in the common protocol to provide intelligent network (IN) service control for the legacy network;
   the protocol interface further adapted to receive second call messages in a second protocol from an IMS network, and convert the second call messages in the second protocol to the common protocol;
   the service controller further adapted to receive the second call messages in the common protocol, and process the second call messages in the common protocol to provide IN service control for the IMS network.

2. The converged service control system of claim 1 further comprising:
   an online charging interface adapted to receive online charging messages from the service controller for the legacy network and the IMS network, and transmit the online charging messages to an Online Charging System (OCS).

3. The converged service control system of claim 2 wherein the online charging interface comprises a Diameter Ro interface.

4. The converged service control system of claim 1 further comprising:
   an offline charging interface adapted to receive offline charging messages from the service controller for the legacy network and the IMS network, and transmit the offline charging messages to an offline charging system.

5. The converged service control system of claim 4 wherein the offline charging interface comprises a Diameter Rf interface.

6. The converged service control system of claim 1 further comprising:
   a notification system adapted to receive notification messages for the legacy network from the service controller, and control an intelligent peripheral in the legacy network to provide announcements to subscribers of the legacy network.

7. The converged service control system of claim 1 further comprising:
   a notification system adapted to receive notification messages for the legacy network from the service controller, and control a text message server in the legacy network to provide text messages to subscribers of the legacy network.

8. The converged service control system of claim 1 further comprising:
   a notification system adapted to receive notification messages for the IMS network from the service controller, and control a media server in the IMS network to provide announcements to subscribers of the IMS network.

9. The converged service control system of claim 1 wherein the legacy network comprises one of a wireline telecommunications network, a CDMA network, and a GSM network.

10. The converged service control system of claim 1 wherein the IN service control includes providing at least one of an 800-number routing service, a pre-paid service, a voice mail routing service, an abbreviated dialing service, and a notification service.

11. A method of providing converged service control for at least one legacy network and an IMS network, the method comprising:
    receiving first call messages in a first protocol from a legacy network;
    converting the first call messages in the first protocol to a common protocol;
    processing the first call messages in the common protocol to provide intelligent network (IN) service control for the legacy network;
    receiving second call messages in a second protocol from an IMS network;
    converting the second call messages in the second protocol to the common protocol; and
    processing the second call messages in the common protocol to provide IN service control for the IMS network.

12. The method of claim 11 further comprising:
    generating online charging messages for calls in the legacy network and for calls in the IMS network; and
    transmitting the online charging messages to an Online Charging System (OCS).

13. The method of claim 11 further comprising:
    generating offline charging messages for calls in the legacy network and for calls in the IMS network; and
    transmitting the offline charging messages to an offline charging system.

14. The method of claim 11 further comprising:
    generating notification messages for calls in the legacy network; and
    controlling an intelligent peripheral in the legacy network to provide announcements to subscribers of the legacy network.

15. The method of claim 11 further comprising:
    generating notification messages for calls in the legacy network; and
    controlling a text message server in the legacy network to provide text messages to subscribers of the legacy network.

16. The method of claim 11 further comprising:
    generating notification messages for calls in the IMS network; and
    controlling a media server in the IMS network to provide announcements to subscribers of the IMS network.

17. The method of claim 11 wherein the legacy network comprises one of a wireline telecommunications network, a CDMA network, and a GSM network.

18. The method of claim 11 wherein the IN service control includes providing at least one of an 800-number routing service, a pre-paid service, a voice mail routing service, an abbreviated dialing service, and a notification service.

19. A converged service control system, comprising:
- a protocol interface adapted to receive first call messages in a first protocol from a legacy network, and convert the first call messages in the first protocol to a common protocol;
- a service controller adapted to receive the first call messages in the common protocol, and process the first call messages in the common protocol to provide intelligent network (IN) service control for the legacy network;
- the protocol interface further adapted to receive second call messages in a second protocol from an IMS network, and convert the second call messages in the second protocol to the common protocol;
- the service controller further adapted to receive the second call messages in the common protocol, and process the second call messages in the common protocol to provide IN service control for the IMS network;
- an online charging interface adapted to receive online charging messages from the service controller for the legacy network and the IMS network, and transmit the online charging messages to an Online Charging System (OCS);
- an offline charging interface adapted to receive offline charging messages from the service controller for the legacy network and the IMS network, and transmit the offline charging messages to an offline charging system; and
- a notification system adapted to receive notification messages for the legacy network and the IMS network, and provide notification to subscribers of the legacy network and the IMS network.

20. The converged service control system of claim 19 wherein the IN service control includes providing at least one of an 800-number routing service, a pre-paid service, a voice mail routing service, an abbreviated dialing service, and a notification service.

* * * * *

UNITED STATES PATENT AND TRADEMARK OFFICE
CERTIFICATE OF CORRECTION

PATENT NO. : 7,620,384 B2  Page 1 of 1
APPLICATION NO. : 11/374262
DATED : November 17, 2009
INVENTOR(S) : Cai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 645 days.

Signed and Sealed this

Twenty-sixth Day of October, 2010

David J. Kappos
*Director of the United States Patent and Trademark Office*